United States Patent [19]

Lovatt

[11] 4,110,069

[45] Aug. 29, 1978

[54] SUPPORT STRUCTURE FOR CERAMIC WARE

[75] Inventor: William John Lovatt, Stoke on Trent, England

[73] Assignee: Acme Marls Limited, Stoke on Trent, England

[21] Appl. No.: 762,527

[22] Filed: Jan. 26, 1977

[30] Foreign Application Priority Data

Jan. 31, 1976 [GB] United Kingdom ............... 3880/76

[51] Int. Cl.$^2$ ............................................ F27D 5/00
[52] U.S. Cl. ................................ 432/258; 432/259; 211/126; 211/186; 211/189; 264/57
[58] Field of Search .................... 432/253, 258, 259; 264/57-58; 211/41, 126, 186, 189; 312/195, 286, 350

[56] References Cited

U.S. PATENT DOCUMENTS

| 3,159,437 | 12/1964 | Jentzen | 211/187 |
|---|---|---|---|
| 3,570,682 | 3/1971 | Elliott | 211/126 |
| 3,780,386 | 12/1973 | Fouks et al. | 211/186 |
| 3,963,125 | 6/1976 | Baggott | 211/126 |

FOREIGN PATENT DOCUMENTS

| 1,365,419 | 5/1964 | France | 211/186 |
|---|---|---|---|
| 333,402 | 8/1930 | United Kingdom | 432/258 |
| 636,515 | 5/1950 | United Kingdom | 432/258 |

*Primary Examiner*—John J. Camby
*Assistant Examiner*—Henry C. Yuen
*Attorney, Agent, or Firm*—Parmelee, Miller, Welsh & Kratz

[57] ABSTRACT

The invention is a support structure for the firing of flat ceramic articles such as tiles. The structure comprises a composite back wall of loosely interconnected planar components, some of which have upright apertures to receive hooks formed on the edges of upright second components attached at right angles to form transverse walls. Equally spaced fins are hooked into apertures in the transverse walls to form shelves to carry the edges of the ceramic articles. At some levels the fins are replaced by tie bats bridging the space between adjacent transverse walls. All of the components are formed by die pressing which precisely controls their dimensions in the plane of the component although not necessarily the thickness so that the dimensions of the overall structure are very precisely controlled and it can be loaded by machine without difficulty.

1 Claim, 6 Drawing Figures

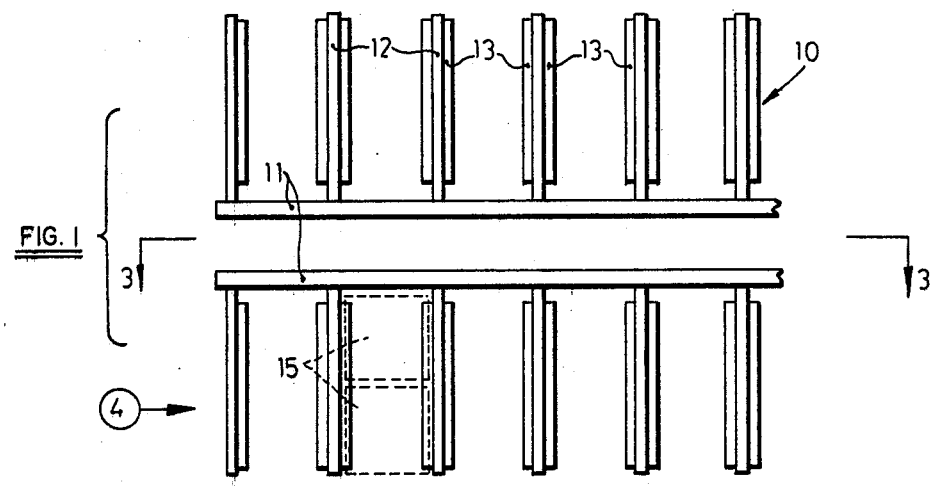
FIG. 1
FIG. 2
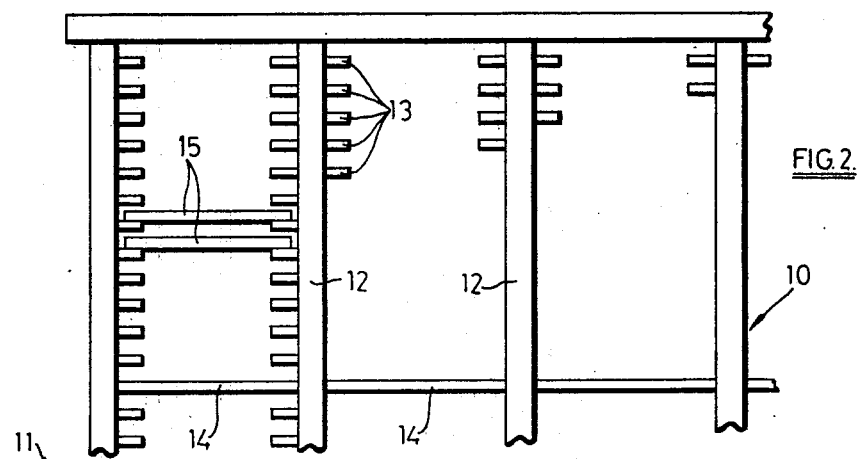
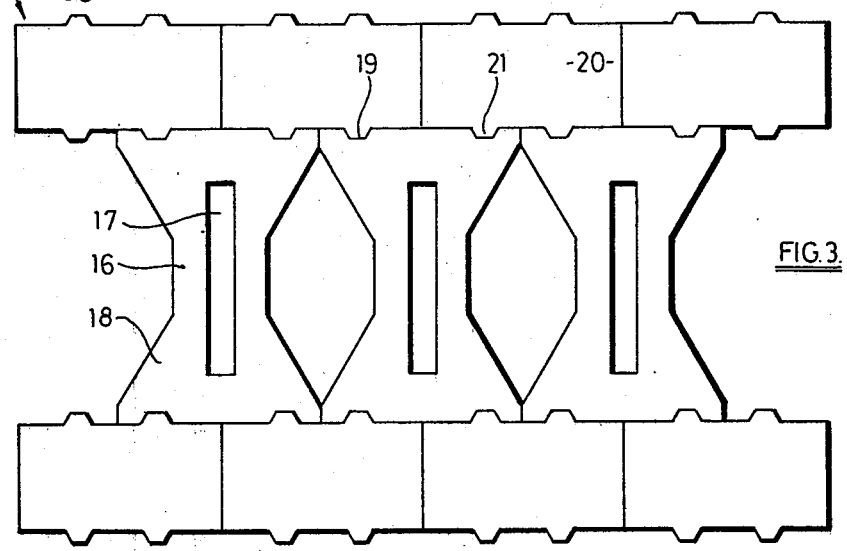
FIG. 3

SUPPORT STRUCTURE FOR CERAMIC WARE

This invention relates to a support structure for generally flat articles of ceramic ware, specifically tiles, during firing.

Tiles have hitherto been supported during firing in "tile boxes" which are stacked on a movable kiln car and passed through a tunnel kiln, for example, for appropriate firing treatment.

Each tile box comprised a base, two opposed upright walls having fins on each surface, and a top. Each box was spaced apart from its horizontal neighbours in the stack by the size of one tile. Tiles were slid into each box to be supported horizontally by the inwardly facing fins or between horizontally adjacent boxes to be supported on the outwardly facing fins.

Since the boxes were spaced, tie bats were used to link them together in horizontal rows to form the stack so that the overall weight and bulk of a stack of such boxes on a kiln car was relatively great compared with that of the tiles carried. Furthermore, the filling and emptying of the boxes could not be successfully automated without great cost. This was partly because of the difficulty caused by the presence of the thick tie bats which spaced the boxes, since a tile handling machine inserting tiles in the boxes would have to avoid the tie bats. The machine would need expensive detecting equipment to detect the presence of a tie bat and would need electronic or other sophisticated control of positioning so that tiles were not introduced at positions where they would be obstructed by the boxes or the tie bats.

Mainly, however, the difficulty of automating the insertion of tiles in such boxes was a result of the dimensional tolerances of the individual boxes being too great to allow the tiles to be successfully positioned. Individual boxes varied somewhat in size and shape due to these manufacturing tolerances and, coupled with the possible inaccurate positioning of boxes relative to each other, the cumulative effect over a whole kiln car superstructure was quite large. Again, a machine for loading the kiln car would need electronic or other precise positioning control in order to successfully load the tile boxes.

It is an object of the present invention to provide a support structure for generally flat ceramic ware such as tiles, which is capable of being manufactured to closer dimensional tolerances than the above described structure so as to enable it to be loaded automatically by relatively simple machinery.

According to the invention there is provided a support structure for generally flat ceramic ware, the structure comprising a plurality of generally planar components, first such components being interengaged in edge to edge relationship to provide an upright linear back wall, second such components being secured to said first components generally perpendicular thereto and in generally parallel upright planes to form transverse walls, each transverse wall having a plurality of third such components secured thereto on one or both faces thereof to form fins extending laterally therefrom in equally spaced generally horizontal planes, all of said planar components having been formed by a method in which the dimensions of said components in the plane of the components are precisely controllable.

The first components may afford a plurality of apertures receiving respective edge formations of the second components to secure the first and second components together. The apertures may be generally upright.

The first components forming the back wall may include generally vertically disposed elongate posts and generally horizontally disposed elongate link members disposed in relatively staggered courses, the posts and link members having interfitting formations whereby they are connected together but said components being free of any permanent attachment to each other (for example by cement).

A respective one of said apertures may be provided in each post.

The fins may be engaged with apertures of the second components. The fins may be provided with hooks engaging gravitationally in locked positions in upright apertures of the second components or alternatively the upright apertures and the fins may be provided with co-operating wedge formations.

The fins may be provided with spacers to maintain the equal spacing between the fins.

All the fins at one or more horizontal levels in the structure may be replaced by tie bats, each of a thickness equal to that of a fin and of a width capable of bridging the separation between adjacent transverse walls, whereby said separation is maintained constant.

The invention will now be described in more detail by way of example only with reference to the accompanying drawings in which:

FIG. 1 is a plan view of part of a kiln car superstructure embodying the invention and indicating the positioning of tiles thereon.

FIG. 2 is a front elevational view of part of the kiln car shown in FIG. 1.

FIG. 3 is a detail view of a back wall of the superstructure taken along the line 3—3.

Figure 4:
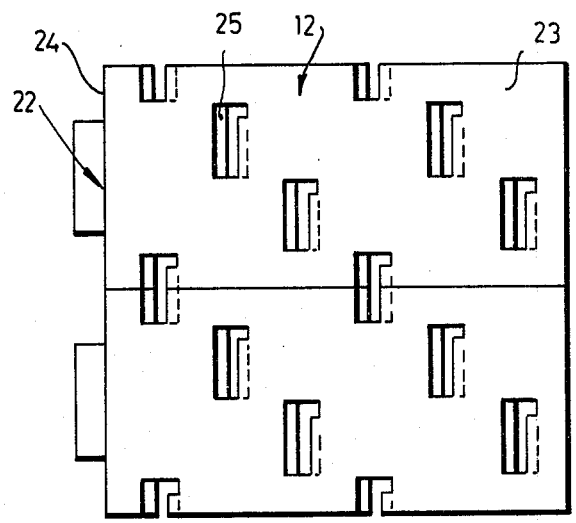
FIG. 4 is a view of a transverse wall of the kiln car superstructure as viewed on the arrow 4 in FIG. 1.

Referring firstly to FIGS. 1 and 2 of the drawings, these give a general indication of the construction of a kiln car superstructure designed for the firing of tiles.

The superstructure 10 is provided on a kiln car and comprises a pair of elongate back walls 11 which are disposed generally parallel to each other down the centre of the kiln car in the direction of travel of the car.

Each back wall 11 has a plurality of transverse walls 12 secured thereto in an upright position at right angles to the back wall 11. Each of the transverse walls 12 has a plurality of fins 13 provided on each surface of the transverse wall, although it is not necessary to provide such fins on the end wall 5 of the series.

As seen in FIG. 2, the fins 13 are equally spaced apart and extend from top to bottom of the transverse walls 12. At spaced intervals, a horizontal row of fins is replaced by tie plates 14 which are of the same thickness as the fins 13, the spacing remaining regular.

FIG. 1 illustrates the placing of tiles shown in dotted lines at 15. Each pair of fins supports two tiles, one adjacent the back wall 11 and the other adjacent the open mouth formed between the free ends of the transverse walls 12. These tiles are also shown at 15 in FIG. 2.

FIGS. 1 and 2 are merely diagrammatical and intended to give an idea of the layout of the support structure as a whole. However, the back wall 11 is a composite structure shown in more detail in FIG. 3.

It is built up of two different types of component, each of which is flat in the plane of the paper as viewed in FIG. 3.

The first components are upright posts 16 which are of somewhat waisted configuration and have an upright central slot 17. The enlarged top and bottom ends of the posts 18 are provided with recesses 19 which are shallow and tapered.

The remainder of the back wall is made up of generally horizontally disposed link members 20 which have projecting formations 21 of the same shape as the recesses 9. The upright posts 16 and link members 20 are laid in alternate horizontal courses in staggered relation after the fashion of a brick wall so that the link members and upright posts are interengaged by the formations 21 seating in the recesses 19.

The posts 16 and link members 20 are planar, as mentioned above and are formed by a simple die pressing technique.

In this technique the dimensions of the article formed in the plane of the article can be very precisely controlled. The thickness of the article may be controlled within certain limits but not so precisely as the dimension in the plane of the article.

It will be seen that, since the posts 16 and link members 20 are placed in edge to edge relationship in the back wall, the closely controlled tolerances of the components are reflected in the overall dimensions of the wall being very closely controlled. Although the thickness of the components forming the wall may vary somewhat, their edge to edge dimensions have been precisely defined by the die pressing process by which they are made and, even over the larger area of the wall, the positioning of the components can be achieved very precisely and the cumulative effect of tolerances is very slight.

Conventional tile boxes have hitherto generally been made by casting, in which the dimensions of the box cannot be very closely controlled and the tolerances are of the order of a few percent. This can make a very large difference when the cumulative effect over a large tile support structure mounted on a kiln car is considered and is one of the chief factors which prevent easy automatic loading of such a structure.

It will be noted from FIG. 3 that the upright apertures 17 will also be precisely spaced apart because their spacing is measured in the plane of the back wall. The position of the apertures is defined by means on the top and bottom die plates during the die pressing process and is consequently precisely controlled.

Referring to FIG. 4 of the drawings, this diagrammatically shows a portion of the upright transverse wall 12 which is again formed from die pressed components in the form of flat plates. At one edge of the plate, which will form the rear of the transverse wall and which will be attached to the back wall 11, there are edge formations, the position of which is generally indicated at 22. The precise form of the edge formations is not critical except that they are required to interengage with the upright apertures 17 of the posts 16. For example, they may comprise hook formations engageable gravitationally in the apertures 17 or some form of wedging means may be provided on the aperture and edge formation so that each upright plate 23 forming the transverse wall 12 is firmly engaged with an associated post 16 and has its rear edge 24 positioned in abutment with a face of the associated post.

Figure 5:
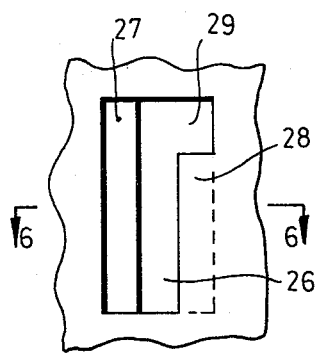
FIG. 5 is a detail view of a type of slot which may be provided in the upright wall of FIG. 4.
Figure 6:
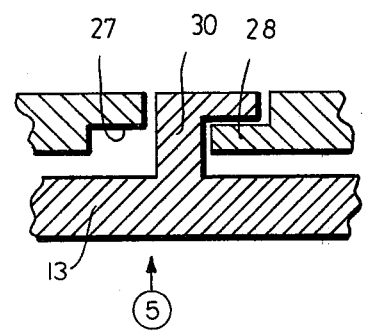
FIG. 6 is a sectional view on the line 6—6 of FIG. 5, with the addition of a detachable fin not shown in FIG. 5.

Each upright plate 23 has a plurality of slots 25, the detailed construction of which may be as illustrated in FIGS. 5 and 6 of the drawings. The slots 25 are staggered as shown so as not to weaken the plates significantly.

While the slots may be of any suitable form to receive a plurality of horizontal fins, one preferred form of slot is shown in FIG. 5 and 6 of the drawings. The central portion 26 of the slot passes right through the upright plate 23 and is bordered on each upright side by a rebated portion. On the left hand side as shown in FIG. 6, the rebated portion 27 extends from top to bottom of the slot whereas, on the right hand side of FIG. 5, the rebated portion 28 extends to a region near the top of the slot and is then cut away at 29 so that the through aperture is of inverted L-shape. The cut-away is at the top of the plate.

Each fin comprises a flat piece of ceramic material, again formed by die pressing, which is provided at two or more spaced positions with a hook 30 as shown in FIG. 6. A spacer is cemented to the fin at some suitable position so that adjacent fins will automatically be spaced apart by the spacer (not shown). Alternatively, the spacer and fin can be pressed together in one piece.

In order to fit the fin 13 to the upright plate 23, the hooks 30 are presented at the cut out portions 29 of a pair of slots 25 and are then pushed through the slots and lowered so as to adopt the position shown in FIG. 6 of the drawings. Adjacent fins are simply stacked one on another and separated by their associated spacers.

Since the pairs of slots 25 are staggered relative to each other, it may be necessary to provide the hooks 30 at different positions on different fins or to make some other arrangements such as reversing the fins end for end, for example, in order to ensure that the fins are disposed one above another throughout the height of the support structure.

The precise details of the fin attachment are not material to this invention, however, since it will be seen that the major point which ensures the accuracy of the support structure is the use of die pressing or similar process in which the side to side dimensions of the component formed are precisely controlled. This enables the exact sizing of the back wall and the exact positioning of the attachment points of the transverse walls and fins to be determined.

In order to prevent the outer free edges of the upright plates 23 from becoming angularly inclined relative to each other, thereby altering the spacing between them thin tie plates 14, which are of the same thickness as the fins, are disposed at spaced intervals down the support structure in place of a horizontal row of fins.

Because the tie plates are the same thickness as the fins, a machine which is automatically loading the support structure with tiles will progress from the top to the bottom of the support structure inserting adjacent tiles on pairs of fins which face each other and, without being able to distinguish between the tie plates and fins, will insert further tiles on the tie plates themselves which will effectively act as shelves to hold these tiles during firing. Thus, the progress of the machine from the top of the kiln support to the bottom is uninterrupted and the positioning of the tiles will be at regularly spaced intervals, without any need to have automatic compensation for the tie plates themselves which will effectively act as shelves to hold these tiles during firing. Thus, the progress of the machine from the top of the kiln support structure to the bottom is uninterrupted and the positioning of the tiles will be at regularly spaced intervals, without any need to have automatic compensation for the tie plates. It will be appreciated that the tie plates can be made thin because they do not need to support any part of the tile support assembly but only act as spacers of the other parts which are self supporting.

Although the described structure enables an automatic machine to be used for loading, it can also be loaded by hand, probably with greater ease than with hitherto known types of tile box.

Furthermore, in the event of glaze dripping from the tiles onto the support, this glaze will lodge on the fins and thus, after some period of use, the fins can be removed and replaced by fresh fins, without the need to replace any other part of the support structure. In contrast, when a tile box has been used a number of times and becomes coated with glaze, the entire box has to be scrapped and a new supporting structure built because the glaze build-up tends to mar the fresh tiles being placed on the tile box fins and can cause these to stick in place and have to be scrapped.

The construction of the back wall in the form of a number of interconnected elements which are not secured together by cementing but only by interfitting formations, enables the thermal and mechanical shocks transmitted to the kiln car during its progress through a kiln to be dissipated throughout the back wall structure in generally known manner, without causing the support structure to collapse or to be damaged significantly.

It will be appreciated that various modifications can be made to the structure described while still remaining within the scope of the invention.

I claim:

1. A support structure for generally flat ceramic ware, the support structure comprising a plurality of generally planar components, all of which are die pressed and have precisely controlled dimensions in the plane of the components, said plurality of generally planar components comprising first such components including generally vertically disposed elongate posts and generally horizontally disposed elongate link members disposed in relatively staggered courses, the posts and link members having inter-fitting formations whereby they are detachably connected together to provide an upright linear back wall of the support structure; second such components being secured to said first components generally perpendicular thereto and in generally parallel upright planes to form transverse walls; and a plurality of third such components secured to the transverse walls on one or both faces thereof to form fins extending laterally from the transverse walls in equally spaced generally horizontal planes.

* * * * *